United States Patent

[11] 3,603,900

[72] Inventors Kozo Hatori
Sapporo;
Hitoshi Watanabe, Tokyo; Nobuyoshi Yoshida, Tokyo, all of, Japan

[21] Appl. No. 765,580
[22] Filed Oct. 7, 1968
[45] Patented Sept. 7, 1971
[73] Assignee Nippon Electric Company, Limited Tokyo, Japan
[32] Priority Oct. 9, 1967
[33] Japan
[31] 42/64783

[54] DISTRIBUTED CONSTANT RC NETWORK
13 Claims, 15 Drawing Figs.

[52] U.S. Cl. .......... 333/75, 333/70 CR, 333/76
[51] Int. Cl. .......... H03h 7/06
[50] Field of Search .......... 333/70 R, 75, 76, 23, 24

[56] References Cited

UNITED STATES PATENTS 3,371,295 2/1968 Bourgault et al. .......... 333/70 R

OTHER REFERENCES

The Realization of a Transfer Ratio by Means of a Resistor-Capacitor Ladder Network by Fleck et al., Proceedings of the I.R.E., Vol. 39, Issue 9, pp. 1069- 1074, Sept. 1951

Synthesis of Cascaded Three-Terminal RC Networks with Minimum-Phase Transfer Functions by Ordung et al., Proceedings of the I.R.E., pp. 1717- 1723, Dec. 1952

*Primary Examiner*—Herman Karl Saalbach
*Assistant Examiner*—Paul L. Gensler
*Attorney*—Marn & Jangarathis

ABSTRACT: Distributed constant RC network apparatus is provided in accordance with this invention having a pair of complex attenuation poles which reside on the plane defined by the complex angular frequency $s=\gamma+j\omega$. According to this invention a plurality of fundamental circuit means containing various unit elements of a distributed constant RC network are developed. Thereafter, two or more of such plurality of fundamental circuit means may be combined in a predetermined manner to form various embodiments of uniform equal length distributed constant RC network apparatus, according to this invention, having a pair of complex attenuation poles located on an arbitrary point on the plane defined by the complex angular frequency.

INVENTORS
Hitoshi Watanabe
Nobuyoshi Yoshida
Kozo Hatori
BY
Marn & Jangarathis
ATTORNEYS INVENTORS
Hitoshi Watanabe
Nobuyoshi Yoshida
Kozo Hatori
BY
Marn & Jangarathis
ATTORNEYS INVENTORS
Hitoshi Watanabe
Nobuyoshi Yoshida
Kozo Hatori BY
Marn & Jangarathis
ATTORNEYS INVENTORS
Hitoshi Watanabe
Nobuyoshi Yoshida
Kozo Hatori
BY
Marn & Jangarathis
ATTORNEYS INVENTORS
Hitoshi Watanabe
Nobuyoshi Yoshida
Kozo Hatori
BY
Marn & Jangarathis
ATTORNEYS

DISTRIBUTED CONSTANT RC NETWORK

This invention relates to electronic circuits and more particularly to distributed constant RC networks.

The state of the art relating to thin film circuitry monolithic integrated circuits has advanced to the point where it is relatively common to obtain distributed RC circuits formed by the combination of a resistance film layer whose conductivity per unit area is uniform, a dielectric layer whose dielectric factor per unit area is uniform and a metallic or resistance film layer. These circuits may then be used as elemental building blocks in the design and formation of larger distributed constant RC networks which generally comprise a plurality of such RC circuit elements. The design criteria utilized in synthesizing these RC networks from such distributed RC elements has generally required that the unit elements be suitably combined according to the relationship that:

$$Zo^2=R/C$$

wherein $$RC=\tfrac{1}{2}\pi f_o=K \qquad (1)$$

and where $R$ is the resistance per unit length in the direction of transmission, $C$ is the capacitance, $Zo$ is the characteristic impedance, and $K$ is a constant.

The design criteria as well as the methods and techniques therefor are set out in the the article entitled "A Method for Designing Distributed RC Networks," reported by Atsushi Tachibana in the Journal of the Institute of Electronics and Communication Engineers of Japan, May 1963, at page 694 thereof. The unit circuit element thus formed is normally referred to as the unit element of a distributed constant RC network while the network formed by the combination of such unit elements of a distributed constant RC network is denominated as the uniform equal length distributed constant *RC* network. *Zo* in turn is called the characteristic impedance of the unit element. Appropriate reference to these terms may be found, for example, in "The Extract Synthesis of Distributed RC Networks," R. W. Wyndrum, Jr., New York University Report, 400–76.

Although uniform equal length distributed constant RC networks as designed in accordance with prior art teachings have occasionally yielded networks having an attenuation pole present at an arbitrary point located on the plane defined by the complex angular frequency $s=\gamma+j\omega$, such networks were only derived and operated in relation to special conditions and were usually highly restricted in their field of application. Accordingly, the prior art does not possess general purpose uniform equal length distributed constant RC networks having an attenuation pole present at an arbitrary point located on the plane defined by the complex angular frequency $s=\gamma+i\omega$ which may be synthesized from the aforementioned unit elements of a distributed constant RC network or the synthesis techniques required to derive such networks.

Therefore, it is an object of this invention to provide a distributed constant RC network of general application having a pair of complex attenuation poles which reside on the plane defined by the complex angular frequency $s=\gamma+j\omega$. Various other objects of the invention will become clear from the following detailed description of the embodiments disclosed herein, and the novel features of this invention will be particularly pointed out in conjunction with the appended claims.

In accordance with this invention, a plurality of fundamental circuit means containing various unit elements of a distributed constant RC network are developed and two or more of such plurality of fundamental circuit means are combined in a predetermined manner to form uniform equal length distributed constant RC networks, which may be either balanced or unbalanced, having a pair of complex attenuation poles residing at an arbitrary point on the plane defined by the complex angular frequency plane $s=\gamma+j\omega$ The invention will be more clearly understood by reference to the following detailed description of several embodiments thereof in conjunction with the accompanying drawings in which:

FIGS. 1((*a*) and 1(*b*) are schematic representations of a unit element of a distributed constant RC network;

Figure 7:
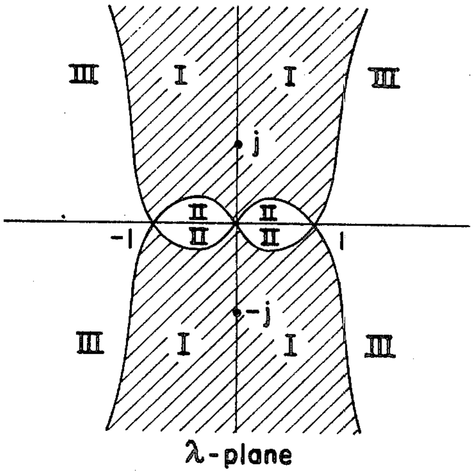
Figure 6:
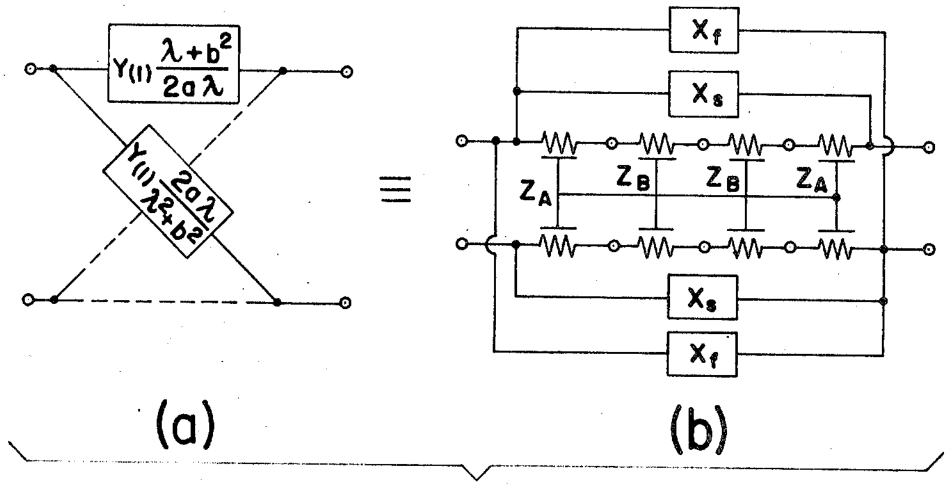
Figure 8:
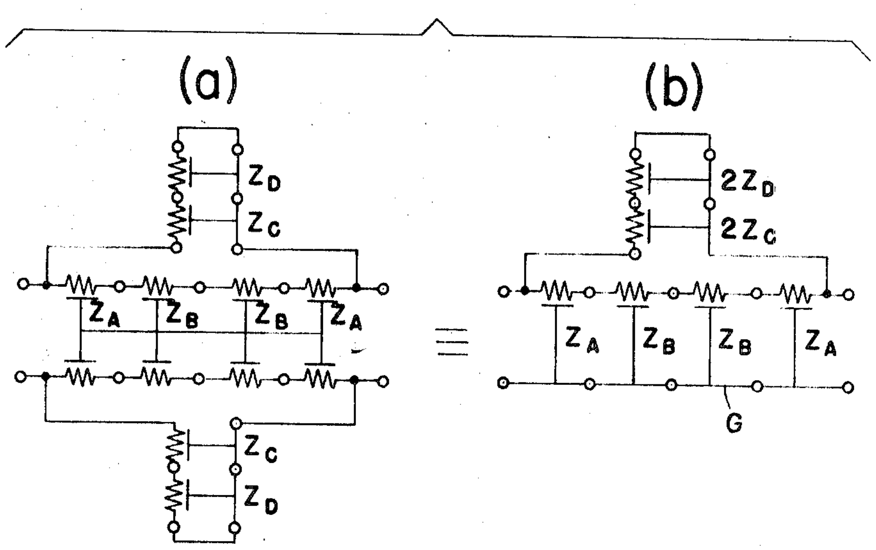
Figure 9:
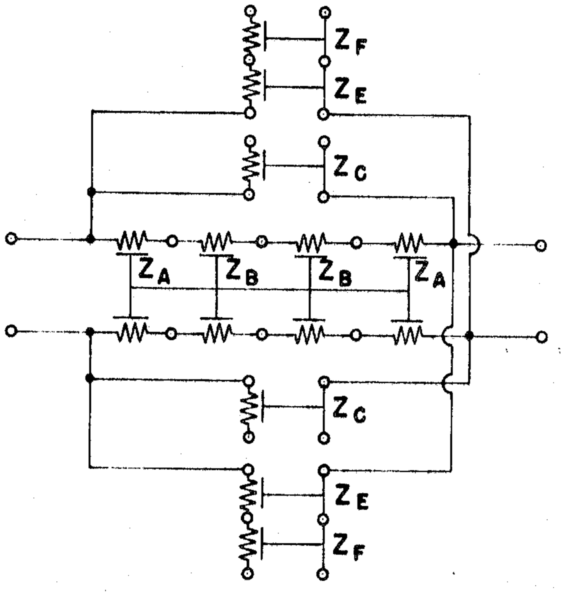
Figure 10:
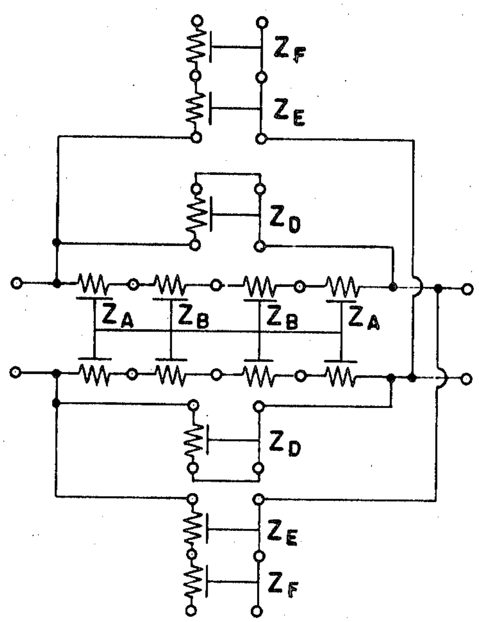
Figure 11:
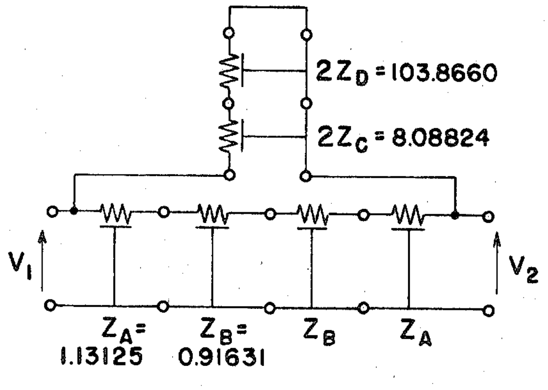
Figure 12:
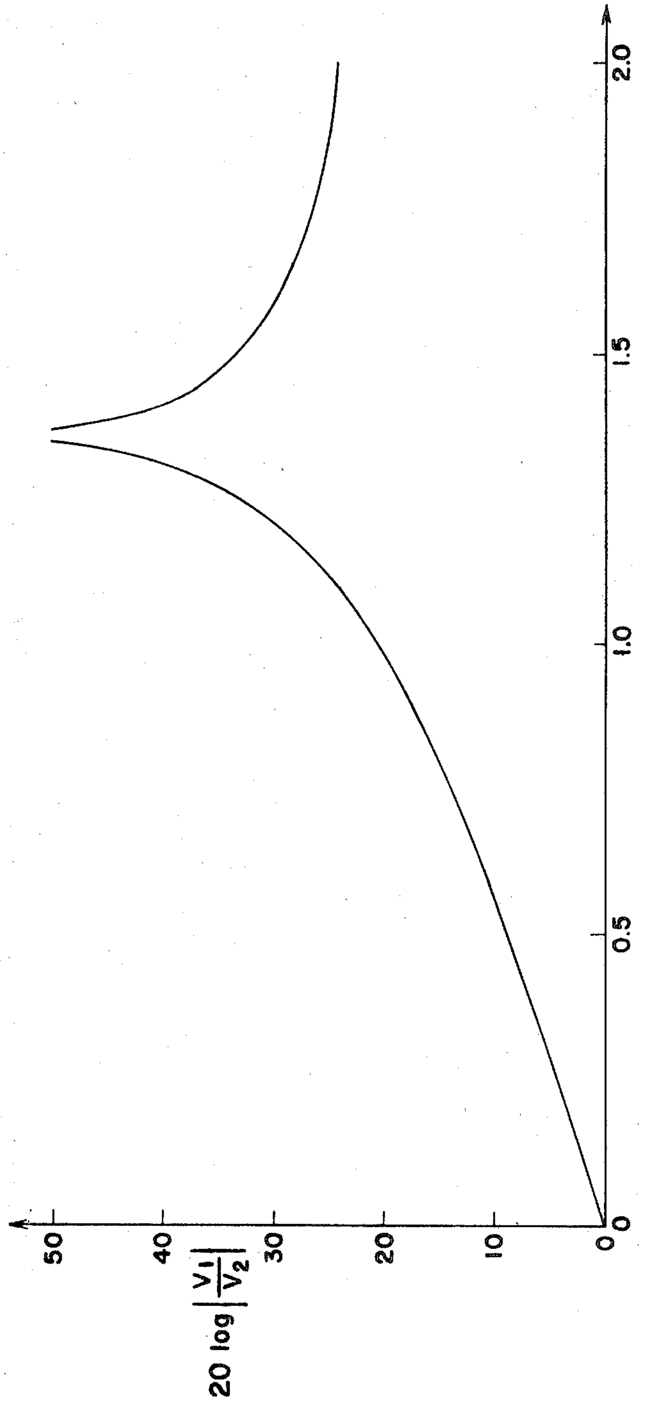

FIGS. 6(*a*) and 6(*b*) depict symmetrical lattice networks in accordance with the teachings of the present invention;

FIG. 7 is a graphical illustration indicating the various regions on the plane λ where the attenuation poles of the networks according to the present invention may reside;

FIGS. 8(*a*) and 8(*6*) illustrate two embodiments of a uniform equal length distributed constant RC network according to the present invention wherein the attenuation poles thereof are located in a first region of the λ plane;

FIG. 9 illustrates an embodiment of a uniform equal length distributed constant RC network according to the present invention wherein the attenuation poles thereof are located in a second region of the λ plane;

FIG. 10 illustrates an embodiment of a uniform equal length distributed constant RC network according to the present invention wherein the attenuation poles thereof are located in a third region of the λ plane;

FIG. 11 depicts yet another embodiment of a uniform equal length distributed constant RC network according to the present invention; and FIG. 12 is a graphical representation of the frequency characteristics of the embodiment of this invention illustrated in FIG. 11.

Figure 1:
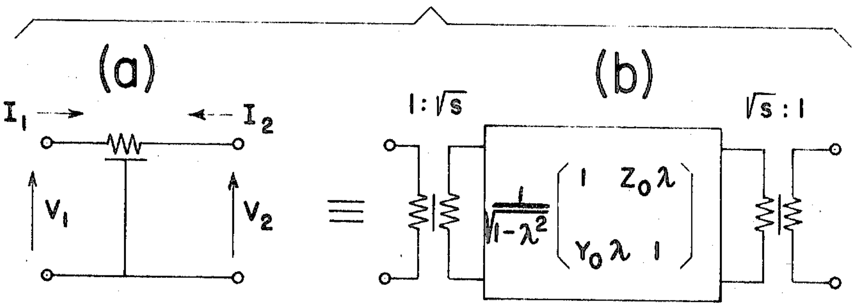

Referring now to the drawings and more particularly to FIGS. 1(*a*) and 1(*b*) thereof, there are shown schematic representations of a unit element of a distributed constant RC network wherein the FIG. 1(*b*) schematic embodies the equivalent circuit of the FIG. 1(*a*) circuit. The transmission characteristic of the unit element of the distributed constant RC network depicted in FIG. 1(*a*) may be expressed in terms of a transmission cascade matrix by the well-known formula that:

$$\begin{pmatrix} V_1 \\ I_1 \end{pmatrix}=\begin{pmatrix} \cosh\sqrt{RC_s} & \sqrt{\frac{R}{C_s}}\sinh\sqrt{RC_s} \\ \sqrt{\frac{C_s}{R}}\sinh\sqrt{RC_s} & \cosh\sqrt{RC_s} \end{pmatrix}\begin{pmatrix} V_2 \\ I_2 \end{pmatrix} \qquad (2)$$

where $s=\gamma+j\omega$=the complex angular frequency. In addition, as is described by Kazuyuki Kuroda in "Composition of Distributed Constant Network," Kyoritsu Shuppan, 1959, and well known to those skilled in the theory of distributed RC networks;

$$\lambda=\tanh\sqrt{RC_s}\ \text{and}\ Zo=\sqrt{\frac{R}{C}} \qquad (3)$$

Furthermore, if it is assumed that the impedance of the equivalent circuit depicted in FIG. 1*b*) is multiplied by 1/ *s*, the cascade matrix of the equivalent unit element of the distributed constant RC network as shown in FIG. 1(*b*) may be written as $$\frac{1}{\sqrt{1-\lambda^2}}\begin{pmatrix} 1 & Zo\lambda \\ Yo\lambda & 1 \end{pmatrix} \qquad (4)$$

where $$Zo=\frac{1}{Yo}=\sqrt{\frac{R}{C}}$$

The unit element circuit illustrated in FIGS. 1(*a*) and 1*b*), as previously mentioned, are generally referred to as the unit element of a distributed RC network and *Zo* is denominated the characteristic impedance of the unit element. As shall be seen hereinafter, a plurality of such unit elements of a distributed RC network may be combined, after the selection of appropriate values, to form the fundamental circuits exemplified in FIGS. 3–5 and described below. Two or more of such fundamental circuits may then be combined, in a manner set forth in detail below, to synthesize the uniform equal length distributed constant RC networks in accordance with the objectives of the present invention.

In accordance with the well-known, fundamental theorem of P. I. Richards, i.e., see Proceedings of the I.R.E., Feb. 1948, page 217, it is possible to synthesize a two-port network having a given positive real input admittance $y(\lambda)$ and a given attenuation pole. This may be expressed by the formula, $$Y_1(\Lambda)=Y(1)\frac{\Lambda Y(1)-Y(\Lambda)}{\Lambda Y(\Lambda)-Y(1)} \qquad (5)$$

where $\Lambda=\Lambda(\lambda)$, a regular mapping, in which the right half plane of $\lambda$ is mapped on the right half plane of $\Lambda$, and the imaginary axis of $\lambda$ is mapped on the imaginary axis of $\Lambda$;

$y(\lambda)=Y(\Lambda(\lambda))$, the given input admittance; and $Y_1(\Lambda)$ as determined by equation (5) is a positive real admittance.

In addition, if Richards' theorem is applied a second time, a second relationship is produced whereby, $$Y_2(\Lambda)=Y_1(1)\frac{\Lambda Y_1(1)-Y_1(\Lambda)}{\Lambda Y_1(\Lambda)-Y_1(1)} \qquad (6)$$

As the input admittance $Y_2(\Lambda)$ in this case also represents a positive real admittance, if $\Lambda(\lambda)=\pm 1$ at a given attenuation pole, then as is obvious $y_2(\Lambda)$ becomes indeterminant whereby it no longer possesses the given attenuation pole or a zero of the real part of $Y_2(\Lambda)$. This may be seen in regard to FIG. 2 which illustrates a cascade synthesis for a driving point admittance.

Figure 2:
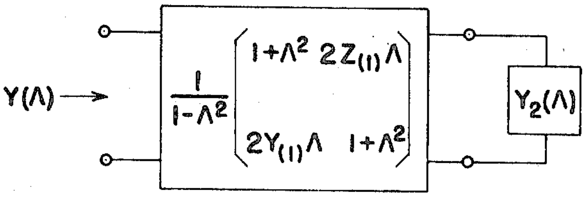
FIG. 2 illustrates a cascade synthesis of a driving point admittance.

The cascade matrix representing the two-part equivalent network depicted in FIG. 2 may be expressed as, $$\frac{1}{1-\Lambda^2}\begin{pmatrix}1+\Lambda^2 & 2Z(1)\\ 2Y(1)\Lambda & 1+\Lambda^2\end{pmatrix} \qquad (7)$$

where $$Z(1)=\frac{1}{Y(1)}$$

Therefore, solving for the attenuation pole of the network represented by equation (7) and illustrated in FIG. 2, it will be seen that the attenuation pole will reside at the points which satisfy the equation, $$(\Lambda(\lambda))^2-1=0. \qquad (8)$$

Accordingly, this invention will provide uniform equal length distributed constant RC networks which are defined by the cascade matrix set forth in equation (7) having an arbitrary pair of complex values for the point $\lambda$ which satisfy equation (8).

Figure 3:
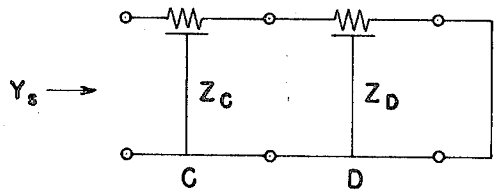
FIG. 3 is a schematic representation of a first fundamental circuit means in accordance with the teachings of this invention.
Figure 4:
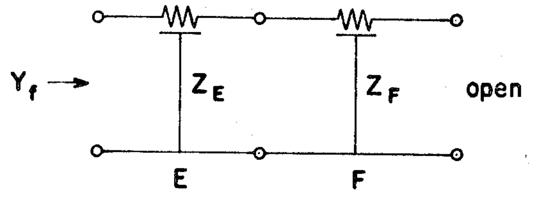
FIG. 4 depicts a second fundamental circuit means according to the present invention.
Figure 5:
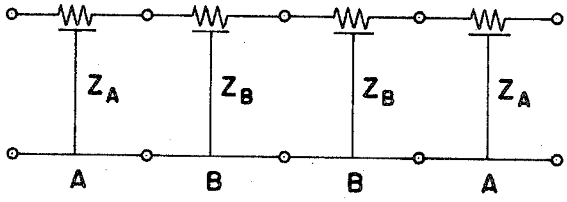
FIG. 5 is illustrative of yet another fundamental circuit means in accordance with the teaching of the instant invention.

This invention employs, for the purposes of the illustrative embodiments of the uniform equal length distributed constant RC networks in accordance with this invention, disclosed herein as exemplary embodiments, three fundamental circuit means which are relied upon in specified combinations of two or more to serve as the basic building blocks for the synthesis of such uniform equal length distributed constant RC networks. These fundamental circuit means are shown in FIGS. 3–5 and each contains a plurality of unit elements of a distributed constant RC network, as depicted in FIGS. 1(*a*) and 1(b), and having the appropriate circuit parameters. The first such fundamental circuit, as shown in FIG. 3, comprises a two-port network which includes two unit elements of a distributed constant RC network C and D whose characteristic impedances are respectively $Z_C$ and $Z_D$. The two unit elements of the distributed constant RC network C and D are connected in cascade to form the two-port network and the output terminals of the two-port network thus formed are connected together to thereby form a short circuit termination. The input admittance of the fundamental circuit of FIG. 3 is expressed as, $$Y_s=\frac{1+\frac{Z_D}{Z_C}\lambda^2}{(Z_C+Z_D)\lambda} \qquad (9)$$

The second fundamental circuit, as shown in FIG. 4, comprises a two-port network which includes two unit elements of a distributed constant RC network, E and F, whose characteristic impedances are $Z_E$ and $Z_F$, respectively. The two unit elements of the distributed constant RC network E and F are connected in cascade to form the two-port network, and the output terminals of the two-port network thus formed are open circuited. The input admittance of the fundamental circuit of FIG. 4 is expressed as, $$Y_f=\frac{\left(\frac{1}{Z_E}+\frac{1}{Z_F}\right)\lambda}{1+\frac{F_E}{Z_F}\lambda^2} \qquad (10)$$

The third fundamental circuit illustrated herein, as depicted in FIG. 5, also comprises a two-port network which includes four unit elements of a distributed constant RC network. The four unit elements of a distributed constant RC network, as shown in FIG. 5, comprise two unit elements A and two unit elements B whose characteristic impedances are respectively $Z_A$ and $Z_B$. The four unit elements are symmetrically connected in the order A–B–B–A to form the illustrated two-port network of FIG. 5. The short circuit admittance matrix of the network depicted in FIG. 5 may be represented as, $$Y=\frac{1+\frac{Z_B}{Z_A}\lambda^2}{2(Z_A+Z_B)\lambda}\begin{pmatrix}1 & -1\\ -1 & 1\end{pmatrix}+\frac{\left(\frac{1}{Z_A}+\frac{1}{Z_B}\right)\lambda}{2\left(1+\frac{Z_A}{Z_B}\lambda^2\right)}\begin{pmatrix}1 & 1\\ 1 & 1\end{pmatrix} \qquad (11)$$

If equation (7), the cascade matrix with which it is desired to define the uniform equal length distributed constant RC networks according to the invention, is now rewritten in terms of a short circuit termination admittance matrix, the equation becomes, $$Y=\frac{Y_{(1)}}{2\Lambda}\begin{pmatrix}1 & -1\\ -1 & 1\end{pmatrix}+\frac{Y_{(1)}\Lambda}{2}\begin{pmatrix}1 & 1\\ 1 & 1\end{pmatrix} \qquad (12)$$

Further, it is assumed that, $$\Lambda=2a\lambda/\lambda^2+b^2) \text{ where } a>0 \text{ and } b>0. \qquad (13)$$

Equation (7 as rewritten in terms of a short circuit termination admittance matrix, equation (12), now becomes, $$Y=\frac{Y_{(1)}}{2}\cdot\frac{\lambda^2+b^2}{2a\lambda}\begin{pmatrix}1 & -1\\ 1 & 1\end{pmatrix}+\frac{Y_{(1)}}{2}\,\frac{2a\lambda}{\lambda^2+b^2}\begin{pmatrix}1 & 1\\ 1 & 1\end{pmatrix} \qquad (14)$$

A network defined by the short circuit termination admittance matrix expressed in equation (14) may be generally represented by the symmetrical lattice network illustrated in FIG. 6(*a*). In the general lattice network depicted in FIG. 6(*a*), the dotted portions thereof indicate the presence of symmetrical admittance circuits like those shown in the solid portions of the depicted circuit.

Continuing, if in equation (14), the following substitutions are made, $$Y_s+X_s=Y_{(1)}\frac{\lambda^2+b^2}{2a\lambda}, \qquad (15)$$

and $$Y_f+X_f=Y_{(1)}\frac{2a\lambda}{\lambda^2+b^2} \qquad (16)$$

equation (14) may now be written as, $$Y=\frac{Y_s+X_s}{2}\begin{pmatrix}1 & -1\\ 1 & 1\end{pmatrix}+\frac{Y_f+X_f}{2}\begin{pmatrix}1 & 1\\ 1 & 1\end{pmatrix} \qquad (17)$$

Thus, if equation (17) is compared with equation (11), the short circuit termination admittance matrix of the third fundamental circuit means shown in FIG. 5, it will be seen that a network whose short-circuit termination admittance is as required by equation (17) may be synthesized by the utilization of the third fundamental circuit depicted in FIG. 5 and satisfying the relationships that, $$Y_{(1)}\frac{\lambda^2+b^2}{2a\lambda}=\frac{1+\frac{Z_B}{Z_A}\lambda^2}{(Z_A+Z_B)\lambda}+X_s(\lambda) \qquad (18)$$

and $$Y_{(1)}\frac{2a\lambda}{\lambda^2+b^2}=\frac{\left(\frac{1}{Z_A}+\frac{1}{Z_B}\right)}{1+\frac{Z_A}{Z_B}\lambda^2}+X_f(\lambda) \qquad (19)$$

where, the requisite admittance coefficients of equation (11) have been substituted for the admittance terms $Y_s+Y_f$ in equations (15) and (16).

A network synthesized in accordance with the above has been shown diagrammatically in FIG. 6(*b*).

To fully realize a two-port network having the short circuit termination matrix described by equation (14) as a uniform equal length distributed RC network, it is necessary that $X_s$ ($\lambda$) and $X_f\,\lambda$ as described in equations (18) and (19), respectively, be formed as an admittance of an equal length distributed constant RC network. The precise form of a circuit embodying the admittance of the equal length distributed constant RC networks $X_s(\lambda)$ and $X_f(\lambda)$ will vary depending upon the position of the attenuation pole on the $\lambda$ plane. This plane is graphically illustrated in FIG. 7 wherein the $\lambda$ plane is divided into three regions I–III as plotted with the abscissa representing the real axis and the ordinate representing the imaginary axis. As the region I as indicated in FIG. 7 may be described by the inequalities, $$b(1+b^2)-2a\geqq 0 \text{ and}$$
$$(1+b^2)/b-2a\geqq 0, \qquad (20)$$

where $b$ is plotted on the abscissa and $a$ is plotted on the ordinate, when the attenuation pole is present in region I on the $\lambda$ plane, equations (18) and (19) require that the following relations to obtain:

$$X_{f(1)}=0 \qquad (21)$$

and $$X_{s(\lambda)}=\frac{(Z_AZ_BY^2_{(1)}-1)+\left(Z_A^2Y_{(1)}^2-\frac{Z_B}{Z_A}\right)\lambda^2}{(Z_A+Z_B)\lambda} \qquad (22)$$

where, $$Z_A=\frac{1+b^2}{2aY_{(1)}} \qquad (23)$$

and $$Z_B=\frac{b^2(1+b^2)}{2aY_{(1)}} \qquad (24)$$

Therefore, as $X_{s(\lambda)}$ as determined by equation (22) takes the same polynomial form as the input admittance of the first fundamental circuit means depicted in FIG. 3 and defined by equation (10), the first fundamental circuit means depicted in FIG. 3 may be relied upon to form the uniform equal length distributed RC network $X_{s(\lambda)}$ when the attenuation pole resides in region I of the $\lambda$ plane. The characteristic impedances $Z_C$ and $Z_D$ of the fundamental circuit means of FIG. 3 used to synthesize $X_{s(\lambda)}$ under these conditions will be as follows:

$$Z_C=Z_A\left[\left(\frac{1+b^2}{2a}\right)^2-1\right]^{-1} \qquad (25)$$

$$Z_D=Z_A\left[\frac{b(1+b^2)}{2a}-1\right]^{-1}\left[\frac{1+b^{2\,2}}{2a}-1\right] \qquad (26)$$

Accordingly, the desired uniform equal length distributed constant RC network having an attenuation pole in region I of the $\lambda$ plane may be synthesized in the manner shown in FIGS. 8(*a*) and 8(*b*) using the fundamental circuit means depicted in FIGS. 3 and 5. The synthesized networks illustrated in FIGS. 8(*a*) and 8(*b*) differ in that the embodiment thereof shown in FIG. 8(*a*) is balanced while the embodiment of FIG 8(*b*) is unbalanced having a common return line G.

As the region II indicated in FIG. 7 may be described by the inequalities, $$b\leqq 1 \text{ and } 2a\geqq b(1+b^2) \qquad (27)$$

where $b$ is again plotted on the abscissa and $a$ is plotted on the ordinate of FIG. 7, when the attenuation pole is present in region II on the $\lambda$ plane, equations (18) and (19) will yield the following relations:

$$X_{s(\lambda)}=\frac{\frac{Z_A}{Z_B}-\frac{Z_B}{Z_A}}{Z_A+Z_B}\lambda, \qquad (28)$$

and $$X_{f(\lambda)}=\frac{Y^2_{(1)}(Z_A+Z_B)-\frac{Z_A+Z_B}{Z_AZ_B}}{1+\frac{Z_A}{Z_B}\lambda^2}\cdot\lambda \qquad (29)$$

$$Z_A=\frac{2a}{b^2(1+b^2)Y(1)} \qquad (30)$$

and $$Z_B=\frac{2a}{(1+b^2)Y_{(1)}} \qquad (31)$$

Therefore, $X_{s(\lambda)}$, as determined by equation (28), takes the same polynomial form as the input admittance of an open circuited unit element of a distributed constant RC network, as illustrated in FIGS. 1(*a*) and 1(*b*), such an open circuited unit element may be relied upon to furnish the appropriate circuit for $X_{s(\lambda)}$ as defined by equation (28) when the attenuation pole resides in region II of the $\lambda$ plane. In this case, the characteristic impedance $Z_C$ of the open circuited unit element of a distributed constant RC network may be expressed as, $$Z_C=Z_A\frac{b^2}{1-b^2} \qquad (32)$$

In addition, as $X_{f(\lambda)}$ as defined by equation (29) takes the same polynomial form as the input admittance of the second fundamental circuit means depicted in FIG. 4 and determined by equation (10), the second fundamental, open circuited, circuit means depicted in FIG. 4 may be relied upon to form the uniform equal length distributed RC network $X_{f(\lambda)}$ when the attenuation pole resides in region II of the $\lambda$ plane illustrated in FIG. 7. The characteristic impedances $Z_E$ and $Z_F$ of the fundamental circuit means of FIG. 4 which may be used to synthesize $X_{f(\lambda)}$ under these conditions are as follows $$Z_E=Z_A\left[\left(\frac{2a}{b(1+b^2)}\right)^2-1\right]^{-1} \qquad (33)$$

and $$Z_F=Z_Ab^2 \qquad (34)$$

Accordingly, the desired uniform equal length distributed constant RC network having an attenuation pole in the region II of the $\lambda$ plane may be synthesized in the manner shown in FIG. 9 using the fundamental circuit means of FIGS. 4 and 5 and in addition thereto, the open circuited unit element of a distributed constant RC network as illustrated in FIGS. 1(*a*) and 1(*b*).

For the case where the attenuation pole resides in the region III depicted in FIG. 7, as this region may be described by the inequalities, $$b \geqq 1 \text{ and } 2a \geqq \frac{1+b^2}{b} \qquad (35)$$

where $b$ is again plotted on the abscissa and $a$ is plotted on the ordinate of FIG. 7, equations (18) and (19) will yield the following relationships:

$$X_{s(\lambda)} = \frac{\left(\frac{Z_B}{Z_A}\right)^2 - 1}{(Z_A+Z_B)\lambda} \qquad (36)$$

and $$X_{f(\lambda)} = \frac{Y_{(\lambda)} 2 \left(\frac{Z_A}{Z_B}\right)^2 (Z_A+Z_B) - \frac{Z_A+Z_B}{Z_A Z_B}}{1+\frac{Z_A}{Z_B}\lambda^2} \qquad (37)$$

where $$Z_A = \frac{2ab^2}{(1+b^2)Y_{(1)}} \qquad (38)$$

$$Z_B = \frac{2ab^4}{(1+b^2)Y_{(1)}} \qquad (39)$$

In this case, $X_{s(\lambda)}$ as determined by equation (36) takes the same polynomial form as the input admittance of a unit element of a distributed constant RC network terminated in a short circuit, as illustrated in FIGS. 1*a* and 1*b*. Therefore, such a short-circuited unit element may be relied upon to furnish the appropriate circuit for $X_{s(\lambda)}$ as defined by equation (36) when the attenuation pole resides in region III of the λ plane. In this case, the characteristic impedance $Z_E$ of the short-circuited unit element of a distributed constant RC network may be expressed as, $$Z_E = Z_A 1/(b^2-15 \qquad (40)$$

Furthermore, as $X_{f(\lambda)}$ as determined by equation (37) takes the same polynomial form as the input admittance of the first fundamental circuit means illustrated in Figure 3 and defined by equation (9), the first fundamental, short circuited, circuit means here too may be relied upon to form the uniform equal length distributed RC network $X_{f(\lambda)}$ when the attenuation pole resides in region III of the λ plane illustrated in Figure 7. The characteristic impedances $Z_C$ and $Z_D$ of the fundamental circuit means of Figure 3, which may be used to synthesize $X_{f(\lambda)}$ under these conditions, are as follows:

$$Z_C = Z_A \left[\left(\frac{2ab}{1+b^2}\right)^2 - 1\right]^{-2} \qquad (41)$$

and $$Z_D = Z_C b^2 \qquad (42)$$

Thus, the desired uniform equal length distributed constant RC network having an attenuation pole in the region III of the λ plane may be synthesized in the manner shown in FIG. 9 using the fundamental circuit means of FIGS. 3 and 5 together with a short-circuited unit element of a distributed constant RC network as illustrated in FIGS. 1*a* and 1*b*.

FIG. 11 illustrates an embodiment of this invention wherein the depicted two-port network was formed having a short circuit termination admittance matrix defined by, $$Y = \frac{Y_{(1)}}{2\lambda}\begin{pmatrix} 1 & -1 \\ -1 & 1 \end{pmatrix} + \frac{Y_{(1)}\lambda}{2}\begin{pmatrix} 1 & 1 \\ 1 & 1 \end{pmatrix} \qquad (43)$$

where $$Y = \frac{2a\lambda}{\lambda^2+b^2}$$

and $a=0.8$, $b=0.9$, and $Y_{(1)}=1$

The attenuation pole of this two-port network is thus defined by, $\lambda = \pm 0.8 \pm j\, 0.17$. Therefore, as the defined attenuation pole satisfies the inequalities (20) which describe region I of λ plane as shown in FIG. 7, the uniform equal length distributed constant RC network may be realized by either of the circuits illustrated in FIGS. 8*a* or 9. As is apparent, the unbalanced network of FIG. 8*b* has been relied upon in FIG. 11. The characteristic impedances of the network depicted in FIG. 11, as calculated from equations (23)–(26) were found to be as follows:

$Z_A=1.13125$ $Z_B=0.91631$ $Z_C=4.04412$ $Z_D=51.9330$

FIG. 12 is a plot of the values of the real frequency $\omega$ versus $20 \log_{10}\left|\frac{V_1}{V_2}\right|$, of the embodiment of the uniform equal length distributed constant RC circuit according to this invention as depicted in FIG. 11. In obtaining the values plotted in FIG. 12, the ratio of the input voltage $V_1$ to the output voltage $V_2$ was detected when the output terminals of the uniform equal length distributed constant RC circuit depicted in FIG. 11 was opened circuited.

While the invention has been described in connection with several exemplary embodiments thereof, it will be understood that many modifications will be readily apparent to those of ordinary skill in the art; and that this application is intended to cover any adaptations or variations thereof. Therefore, it is manifestly intended that this invention be only limited by the claims and the equivalents thereof.

What is claimed is:

1. A uniform equal length distributed constant RC circuit of a preassigned type in which said RC is the pr product of R representing a resistance value per unit length and C representing a capacitance value per unit length, comprising: a plurality of First, Second, Third and Fourth unit elements having different characteristic impedances; each of said First and Second elements being at least two in number and each of said Third and Fourth elements being at least one in number; each of said First, Second, Third and Fourth elements being a distributed constant RC network; said First and Second elements connected in cascade in a First-Second-Second-First order between two input terminals and two output terminals; said Third and Fourth elements connected in cascade in a Third and Fourth order; said Third element in said Third-Fourth order having two input terminals of which one is connected to one of said input terminals of said First-Second-Second-First order and of which a second is connected to a predetermined one of said output terminals of said First-Second-Second-First order; said Fourth element in said Third-Fourth order having output terminals provided with a preselected termination; whereby said circuit is formed as a preassigned type with a pair of complex attenuation poles at a predetermined point on a plane defined by a complex angular frequency $s=\gamma+j\omega$.

2. The circuit according to claim 1 in which other terminals in said input and output terminals of said First-Second-Second-First element order are connected to a ground return to which said First and Second elements in said last-mentioned order are also connected to form said circuit as said preassigned type which is unbalanced to ground.

3. The circuit according to claim 2 in which said output terminals of said Fourth element in said Third-Fourth element order are provided with said preselected termination which is an open circuit.

4. The circuit according to claim 2 in which said output terminals of said Fourth element in said Third-Fourth element order are provided with said preselected termination which is a short circuit.

5. The circuit according to claim 1 which includes an additional plurality of First, Second, Third and Fourth elements identical in number and impedance characteristics with said first-mentioned First, Second, Third and Fourth elements, respectively; said additional First and Second elements connected in cascade in an additional First-Second-Second-First order between said input and output terminals of said first-mentioned First-Second-Second-First element order; said first-mentioned and said additional First-Second-Second-First element orders having a ground return; said additional Third and Fourth elements connected in cascade in an additional Third-Fourth order; said additional Third element in said additional Third-Fourth element order having two input terminals of which one is connected to the other of said input terminals of said first-mentioned First-Second-Second-First element order and of which a second is connected to a second predetermined one of said output terminals of said last-mentioned order; said additional Fourth element in said additional Third-Fourth element order having output terminals provided with a preselected termination; whereby said circuit is formed as said preassigned type which is balanced to ground.

6. The circuit according to claim 5 in which said output terminals of said additional Fourth element in said additional Third-Fourth element order are provided with said preselected termination which is an open circuit.

7. The circuit according to claim 5 in which said output terminals of said additional Fourth element in said additional Third-Fourth element order are provided with said preselected termination which is a short circuit.

8. The circuit according to claim 5 which includes a plurality of Fifth unit elements, each having a characteristic impedance different from said characteristic impedances of each of said first-mentioned and additional First through Fourth elements and being a distributed constant RC network; each of said Fifth elements having two input terminals and two output terminals; a first of said Fifth elements having one of said input terminals thereof connected to said one input terminal of said first-mentioned First-Second-Second-First element order and said first of said Fifth elements having the other of said input terminals thereof connected to an output terminal of said last-mentioned order in correspondence with said last-mentioned one input terminal thereof; a second of said Fifth elements having one of said input terminals thereof connected to the other of said input terminals of said first-mentioned First-Second-Second-First element order and said second of said Fifth elements having the other of said input terminals thereof connected to an output terminal of said last-mentioned order in correspondence with said last-mentioned other input terminal thereof; each of said Fifth elements having said output terminals thereof provided with a preselected termination; said first-mentioned predetermined one output terminal of said first-mentioned First-Second-Second-First element order corresponding to said last-mentioned output terminal thereof whereby said second input terminal of said first-mentioned Third element is connected to said last-mentioned output terminal of said first-mentioned First-Second-Second-First element order in correspondence with said other input terminal thereof; said second predetermined output terminal of said first-mentioned First-Second-Second-First element order corresponding to said output terminal thereof in correspondence with said one input terminal thereof whereby said second input terminal of said additional Third element is connected to an output terminal of said first-mentioned First-Second-Second-First element order in correspondence with said one input terminal thereof.

9. The circuit according to claim 8 in which said output terminals of at least one of said Fifth elements are provided with said preselected termination which is a short circuit.

10. The circuit according to claim 8 in which said output terminals of at least one of said Fifth elements are provided with said preselected termination which is an open circuit.

11. A uniform equal length distributed constant RC circuit in which RC is the product of R representing a resistance value per unit length and C representing a capacitance value per unit length, comprising: a plurality of First, Second, Third and Fourth unit elements having different characteristic impedances; each of said First and Second elements being two in number and each of said Third and Fourth elements being one in number; each of said First through Fourth elements being a distributed constant RC network; said First and Second elements connected in cascade in a First-Second-Second-First order between two input terminals and two output terminals of which corresponding ones of said input and output terminals are connected to a ground return; said Third and Fourth elements connected in cascade in a Third-Fourth order; said Third element in said Third-Fourth order having two input terminals of which one is connected to the other of said input terminals of said First-Second-Second-Third order and of which a second is connected to the other of said output terminals of said last-mentioned order; said Fourth element having two output terminals provided with a preselected termination; whereby said circuit is formed as an unbalanced type with a pair of complex attenuation poles at a predetermined point on a plane defined by a complex angular frequency $s=\gamma+j\omega$.

12. A uniform equal length distributed constant RC circuit in which RC is the product of R representing a resistance value per unit length and C representing a capacitance value per unit length, comprising:

a plurality of First, Second, Third and Fourth unit elements having different characteristic impedances; each of said First and Second elements being four in number and each of said Third and Fourth elements being two in number; each of said First through Fourth elements being a distributed constant RC network; said First and Second elements connected in two separate cascades, each in a First-Second-Second-First order, between two input terminals and two output terminals; said two First-Second-Second-First element orders having a ground return; one of each of said Third and Fourth elements connected in cascade in one Third-Fourth order; said Third element in said one Third-Fourth order having two input terminals of which one is connected to one of said input terminals of said First-Second-Second-First element orders and of which a second is connected to one of said output terminals of said last-mentioned orders in correspondence with said one input terminal thereof; another of each of said Third and Fourth elements is connected in cascade in another Third-Fourth order; said Third element in said another third-fourth order having two input terminals of which one is connected to the other of said input terminals of said First-Second-Second-First orders and of which a second is connected to the other of said output terminals of said last-mentioned orders in correspondence with said other input terminal thereof; said Fourth element in each of said one and another Third and Fourth orders having output terminals provided with a preselected termination; whereby said circuit is formed as a balanced type with a pair of complex attenuation poles at a predetermined point on a plane defined by a complex angular frequency $s=\gamma+j\omega$.

13. A uniform equal length distributed RC circuit in which RC is a constant and the product of R representing a resistance value per unit length and C representing a capacitance value per unit length, comprising: a plurality of First, Second, Third, Fourth and Fifth unit elements having different characteristic impedances; each of said First and Second elements being four in number and each of said Third, Fourth and Fifth elements being two in number; each of said First through Fifth elements being a distributed constant RC network; said First and Second elements connected in two separate cascades, each in a First-Second-Second-First order, between two input terminals and two output terminals; said two First-Second-Second-First element orders having a common ground return; one of each of said Third and Fourth elements connected in cascade in one Third-Fourth order; said Third element in said one Third-Fourth order having two input terminals of which one is connected to one of said input terminals of said First-Second-Second-First element orders and the other of which is connected to one of said output terminals of said last-mentioned orders; another of each of said Third and Fourth elements in connected in cascade in another Third-Fourth order; said Third element in said another Third-Fourth order having two input terminals of which one is connected to the other of said input terminals of said First-Second-Second-Third orders in correspondence with said one output terminal thereof and another of which is connected to the other of said output terminals of said last-mentioned orders in correspondence with said one input terminal thereof; one of said Fifth elements having two input terminals of which one is connected to said one input terminal of said First-Second-Second-First orders and another of which is connected to said other output terminal thereof in correspondence with said last-mentioned one input terminal; a further of said Fifth elements having two input terminals of which one is connected to said other input terminal of said First-Second-Second-First element orders and another of which is connected to said one output terminal of said First-Second-Second-Third element orders in correspondence with said other input terminal thereof; each of said Fourth elements in said one and another Third-Fourth element orders and each of said Fifth elements having output terminals provided with preselected terminations; whereby said circuit is formed as a balanced type with a pair of complex attenuation poles at a predetermined point on a plane defined by a complex angular frequency $s=\gamma+j\omega$.